US012618544B1

(12) United States Patent
Ji

(10) Patent No.: US 12,618,544 B1
(45) Date of Patent: May 5, 2026

(54) PROJECTION LAMP WITH REPLACEABLE GRATING SHEET

(71) Applicant: Zhongshan Yong Qi Electronic Co., Ltd., Zhongshan (CN)

(72) Inventor: Shaoqi Ji, Zhongshan (CN)

(73) Assignee: ZHONGSHAN YONG QI ELECTRONIC CO., LTD., Zhongshan (CN)

( * ) Notice: Subject to any disclaimer, the term of this patent is extended or adjusted under 35 U.S.C. 154(b) by 0 days.

(21) Appl. No.: 19/220,149

(22) Filed: May 28, 2025

(51) Int. Cl.

| | |
|---|---|
| ***F21V 17/00*** | (2006.01) |
| ***F21V 11/00*** | (2015.01) |
| ***F21V 14/08*** | (2006.01) |
| ***F21V 17/10*** | (2006.01) |
| ***F21V 23/00*** | (2015.01) |
| ***F21V 29/60*** | (2015.01) |
| *F21V 21/08* | (2006.01) |
| *F21Y 113/13* | (2016.01) |

(52) U.S. Cl.
CPC ............ *F21V 17/002* (2013.01); *F21V 11/00* (2013.01); *F21V 14/08* (2013.01); *F21V 17/105* (2013.01); *F21V 23/003* (2013.01); *F21V 29/60* (2015.01); *F21V 21/0824* (2013.01); *F21Y 2113/13* (2016.08)

(58) Field of Classification Search
CPC .......... F21V 29/60; F21V 11/00; F21V 14/08; F21V 23/003; F21V 17/002; F21V 17/105
See application file for complete search history.

(56) References Cited

U.S. PATENT DOCUMENTS

| | | | | |
|---|---|---|---|---|
| 10,859,221 | B2 * | 12/2020 | Chien | F21V 14/08 |
| 11,255,520 | B2 * | 2/2022 | Hartenstein | F21V 19/0055 |
| 2020/0363052 | A1 * | 11/2020 | Li | F21K 9/20 |

FOREIGN PATENT DOCUMENTS

| | | | | |
|---|---|---|---|---|
| CN | 118729200 A | * 10/2024 | F21V 14/00 |

* cited by examiner

*Primary Examiner* — Gerald J Sufleta, II
(74) *Attorney, Agent, or Firm* — HOWARD M COHN and Associates, LLC

(57) ABSTRACT

Disclosed is a projection lamp with a replaceable grating sheet. The projection lamp includes a housing, a laser module, a grating module, and a control board, where the laser module, the grating module, and the control board are arranged in the housing, and the grating module is arranged in front of the laser module; and the grating module includes a motor, a gear set, a magnetic base, a magnet, an iron sheet, an iron sheet fixing base, a tray, a grating, and a grating fixing base. By improving the structure of the grating, the grating may have various pattern combinations, so that the projection styles are enriched. Furthermore, the present disclosure may also be combined with other lighting effect assemblies to create combined lighting effects through projection.

10 Claims, 15 Drawing Sheets

PROJECTION LAMP WITH REPLACEABLE GRATING SHEET

TECHNICAL FIELD

The present disclosure relates to the technical field of projection lamps, and in particular to, a projection lamp with a replaceable grating sheet.

BACKGROUND

At present, projection lamps are widely applied to the fields of illumination, decoration, and the like. In conventional projection lamps, gratings for creating projected pattern effects are fixed in the housings of the projection lamps. If it is needed to replace the gratings, tedious processes of disassembling, replacing, and re-assembling the projection lamps are required, so that it is hard to flexibly change the projection effects of the projection lamps.

SUMMARY

Aiming at shortcomings in the prior art, the present disclosure provides a projection lamp with a replaceable grating sheet, where the grating may be conveniently replaced to flexibly change the projection effect of the projection lamp.

In order to achieve the above objective, the present disclosure adopts the following technical solutions:

A projection lamp with a replaceable grating sheet includes a housing, a laser module, a grating module, and a control board, where the laser module, the grating module, and the control board are arranged in the housing, and the grating module is arranged in front of the laser module; and the grating module includes a motor, a gear set, a magnetic base, a magnet, an iron sheet, an iron sheet fixing base, a tray, a grating, and a grating fixing base, where the gear set includes a driving gear and a driven gear meshing with each other, the driving gear is coaxially fixed to an output shaft of the motor, and the driven gear is coaxially fixed to the magnetic base; the magnet is fixed to the magnetic base, the iron sheet is fixed to the iron sheet fixing base, and the iron sheet and the magnet adsorb with each other magnetically; the grating is detachably fixed to the grating fixing base; the grating fixing base and the iron sheet fixing base are fixedly connected and mounted on an inner ring of the tray, and are axially rotatable in the inner ring of the tray; the housing is provided with a tray access port, a part of the tray stretches out from the tray access port to an outer side of the housing, and the tray is slidable in and out the housing via the tray access port; the magnetic base, the iron sheet, the iron sheet fixing base, and the grating fixing base are each provided with light through holes corresponding to the laser module, and the grating corresponds to the light through hole of the grating fixing base; an emission aperture is arranged on a front side surface of the housing and corresponds to the grating; and the control board is electrically connected to and controls the motor and the laser module.

Further, the laser module includes multiple laser lamps with different colors and a module bracket, a mounting through slot is arranged in an inner cavity of the module bracket, and the multiple laser lamps with different colors are inserted into the mounting through slot; and the control board is electrically connected to and controls the laser lamps with different colors.

Further, an inner cover is arranged in the housing, and the laser module is fixed in the inner cover; and a light through hole is arranged on a front side surface of the inner cover, the magnetic base is located in front of the inner cover, the light through hole of the magnetic base and the light through hole of the inner cover are coaxial, and an emission port of the laser module is aligned with the light through hole of the inner cover.

Further, the magnet is fixed to a front side surface of the magnetic base, and a magnetic cover and a magnetic bottom are respectively fixed to the front side surface and a back side surface of the magnetic base; the magnetic cover and the magnetic bottom are each provided with light through holes, and the light through holes of the magnetic cover and the magnetic bottom are coaxial with the light through hole of the magnetic base; and the magnetic cover covers the magnet.

Further, a grating cover is embedded into the light through hole of the grating fixing base, a grating mounting groove is arranged on a back side surface of the grating cover, and the grating is embedded into the grating mounting groove; and the grating cover is provided with a light through hole corresponding to the grating.

Further, the magnetic base and the driven gear are integrally formed.

Further, multiple magnet mounting grooves are uniformly formed in the front side surface of the magnetic base along a circumferential direction, and the magnet is embedded into each of the magnet mounting grooves.

Further, a tray bracket is further arranged in the housing, the tray bracket is fixed in the housing, a tray slot is arranged on the tray bracket, the tray is inserted into the tray slot and is slidable in and out the tray slot through an opening of the tray slot, and a direction in which the tray is slidable in and out the tray slot is the same as a direction in which the tray is slidable in and out the tray access port.

Further, a lens is further arranged in the housing, and the lens is located in front of the grating module; and the lens is fixed to a front side surface of an inner cap, the inner cap is fixed in the housing, and the inner cap is provided with a light emission hole corresponding to the grating.

Further, a cooling fan is arranged on a rear side in the housing, and a heat dissipation hole is correspondingly formed in a back side surface of the housing.

The present disclosure has the following beneficial effects: with the innovated grating module structure, the grating module may move in and out the housing of the projection lamp conveniently, facilitating quick grating replacement, and enabling flexible changes of the projection effect of the projection lamp. By improving the structure of the grating, the grating may have various pattern combinations, so that the projection styles are enriched. Furthermore, the present disclosure may also be combined with other lighting effect assemblies to create combined lighting effects through projection.

DETAILED DESCRIPTION

The present disclosure will be further described below with reference to the accompanying drawings. It should be noted that embodiments are based on the technical solutions, and provide detailed implementation and specific operation processes. However, the scope of protection of the present disclosure is not limited to the embodiments.

An embodiment of the present disclosure provides a projection lamp with a replaceable grating sheet, as shown in FIG. 1-FIG. 8, including a housing 1, a laser module 2, a grating module 3, and a control board 4, where the laser module 2, the grating module 3, and the control board 4 are arranged in the housing 1, and the grating module 3 is arranged in front of the laser module 2.

Figure 3:
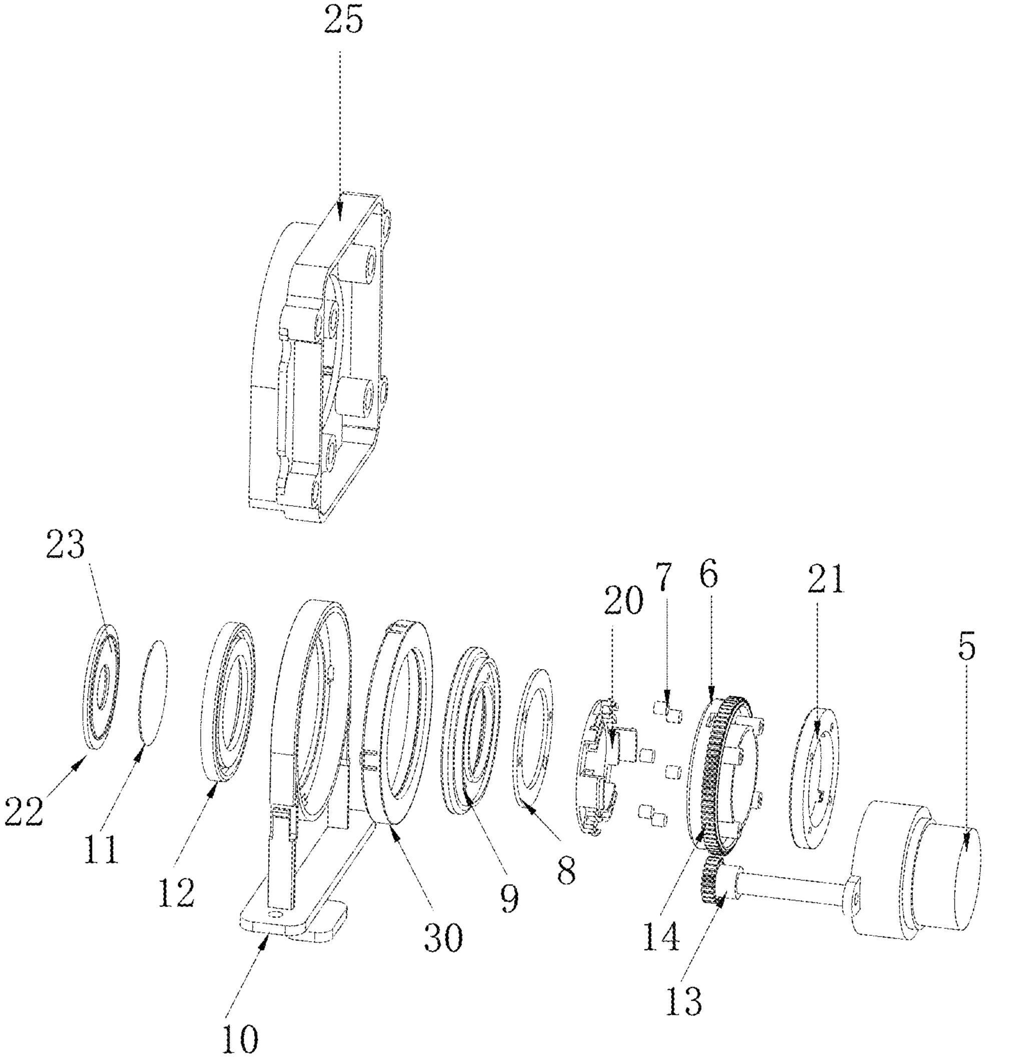
FIG. 3 is an exploded schematic view of a grating module in an embodiment of the present disclosure.
Figure 4:
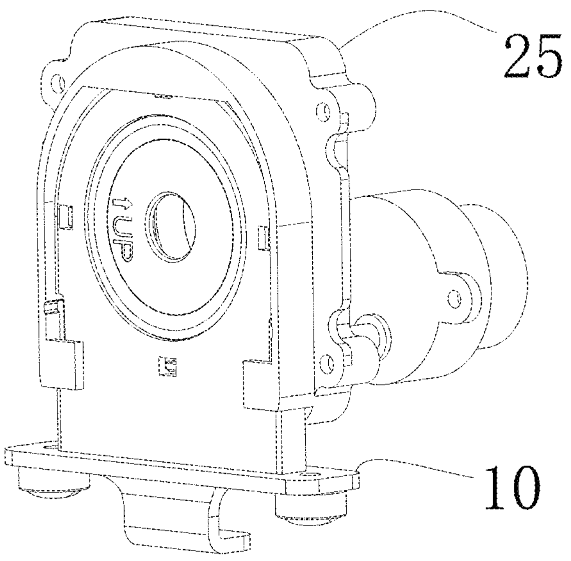
FIG. 4 is an assembled schematic diagram of the grating module in an embodiment of the present disclosure.

As shown in FIG. 3-FIG. 4, the grating module 3 includes a motor 5, a gear set, a magnetic base 6, a magnet 7, an iron sheet 8, an iron sheet fixing base 9, a tray 10, a grating 11, and a grating fixing base 12. The gear set includes a driving gear 13 and a driven gear 14 meshing with each other, the driving gear 13 is coaxially fixed to an output shaft of the motor 5, and the driven gear 14 is coaxially fixed to the magnetic base 6. The magnet 7 is fixed to the magnetic base 6, the iron sheet 8 is fixed to the iron sheet fixing base 9, and the iron sheet 8 and the magnet 7 adsorb with each other magnetically. The grating 11 is detachably fixed to the grating fixing base 12. The grating fixing base 12 and the iron sheet fixing base 9 are fixedly connected and mounted on an inner ring of the tray 10, and are axially rotatable in the inner ring of the tray 10. The housing 1 is provided with a tray access port 15, a part of the tray 10 stretches out from the tray access port 15 to an outer side of the housing 1, and the tray 10 is slidable in and out the housing 1 via the tray access port 15. The magnetic base 6, the iron sheet 8, the iron sheet fixing base 9, and the grating fixing base 12 are each provided with light through holes corresponding to the laser module 2, and the grating 11 corresponds to the light through hole of the grating fixing base 12. An emission aperture 16 is arranged on a front side surface of the housing 1 and corresponds to the grating 11. The control board 4 is electrically connected to and controls the motor 5 and the laser module 2.

It should be noted that the grating in the present disclosure is of a sheet structure. In order to further realize diversified pattern projection, different patterns are integrated into the same grating. Therefore, the grating in the present disclosure may be divided into multiple regions, and then different patterns are arranged in different regions. Thus, the grating may have different patterns, and these patterns are similar to those shown in FIG. 9-FIG. 17. Certainly, the number of equally divided regions depends on the area of the grating.

During work, the control board 4 controls the motor 5 and the laser module 2 to start. After the motor 5 is started, the output shaft of the motor drives the driving gear 13 to rotate axially, and the driving gear 13 further drives the driven gear 14 to rotate axially together with the magnetic base 6. Since the magnetic base 6 is adsorbed and fixed to the iron sheet 8 by the magnet 7 and the iron sheet fixing base 9 is fixed to the grating fixing base 12, when the magnetic base 6 rotates axially, the magnetic base will drive the iron sheet 8, the iron sheet fixing base 9, the grating 11, and the grating fixing base 12 to rotate together. In this case, after passing through the light through holes of the magnetic base 6, the iron sheet 8, the iron sheet fixing base 9, and the grating fixing base 12, a laser ray emitted by the laser module 2 further passes through the grating 11 and is emitted from the front side surface of the housing 1. The formed projected pattern effect corresponds to a designed pattern effect on the grating. When it is needed to change the projected pattern effect, the tray 10 is pulled towards the outer side of the housing 1, so that the magnet 7 and the iron sheet 8 are separated. The tray 10, together with the iron sheet fixing base 9 and the grating fixing base 12, and the iron sheet 8 fixed to the iron sheet fixing base 9 and the grating 11 fixed to the grating fixing base 12 are also pulled out together. In this case, the original grating 11 may be detached from the grating fixing base 12, a new grating 11 is used, and then the tray 10 is inserted into the housing 1 via the tray access port 15 again, so that the grating is replaced. The pattern effect on the grating may be designed according to demands and preferences, and various projected pattern effects may be realized by replacing the grating, as shown in FIG. 9-FIG. 17.

Figure 5:
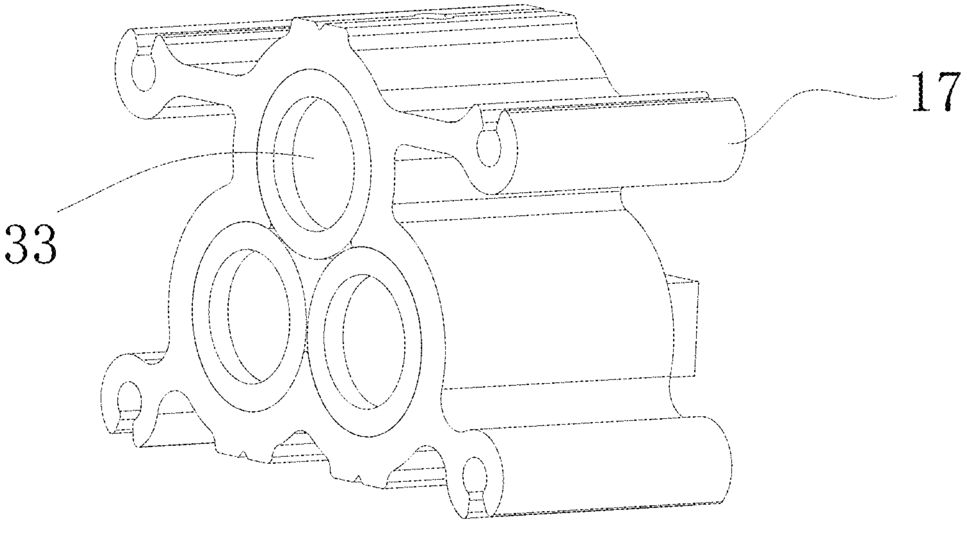
FIG. 5 is a schematic structural diagram of a laser module in an embodiment of the present disclosure.
Figure 6:
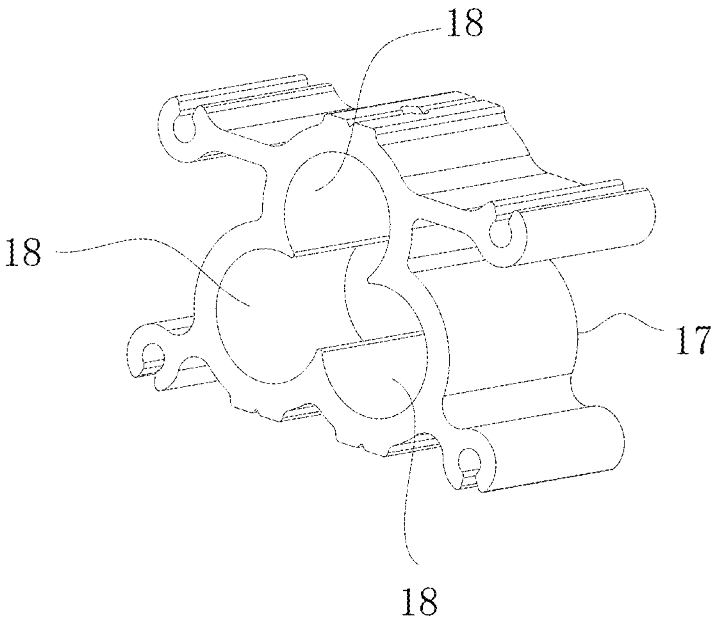
FIG. 6 is a schematic structural diagram of a module bracket in an embodiment of the present disclosure.

In this embodiment, as shown in FIG. 5-FIG. 6, the laser module 2 includes multiple laser lamps 33 with different colors and a module bracket 17, a mounting through slot 18 is arranged in an inner cavity of the module bracket 17, and the multiple laser lamps 33 with different colors are inserted into the mounting through slot 18. The control board 4 is electrically connected to and controls the laser lamps 33 with different colors.

In this embodiment, the laser module includes three laser lamps 33. Therefore, three mounting through slots 18 are arranged in the inner cavity of the module bracket 17, and each of the laser lamps 33 is inserted into each of the mounting through slots 18.

In practical application, laser lamps with different colors may be additionally mounted according to different demands. Thus, different lighting effect combinations may be formed, so that the diversity of the present disclosure is further increased.

Figure 1:
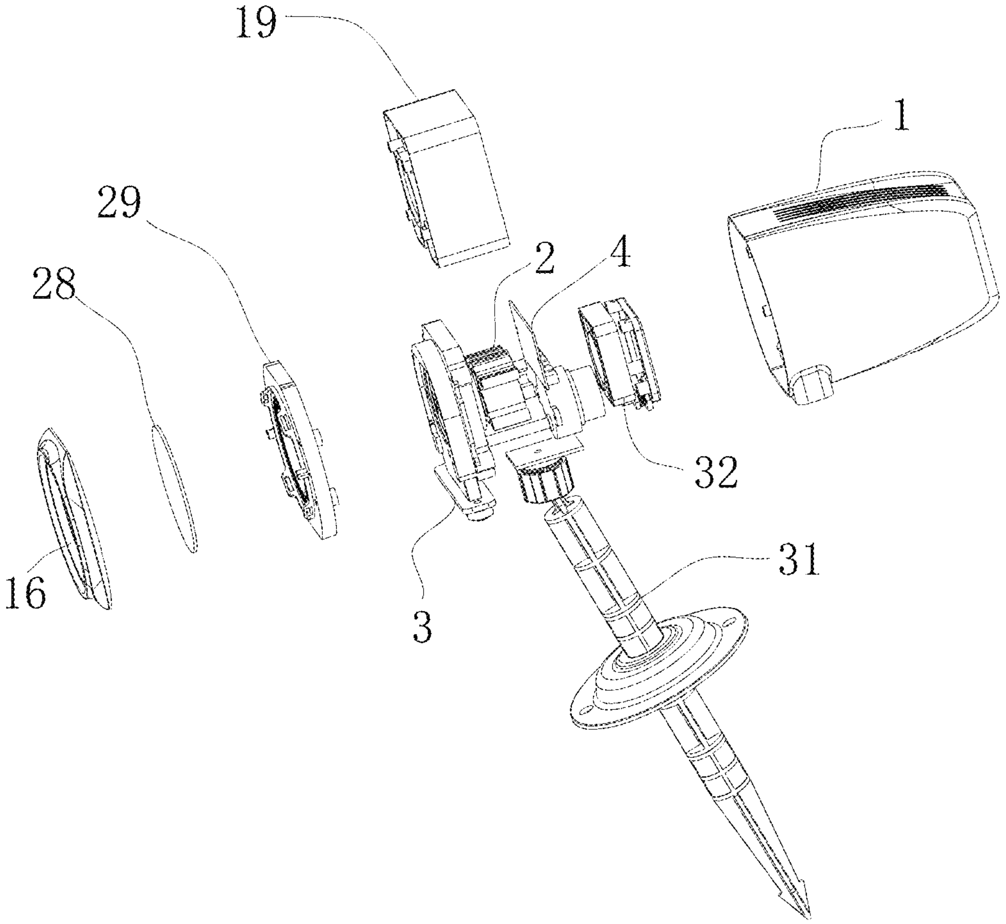
FIG. 1 is an overall exploded schematic view of a projection lamp in an embodiment of the present disclosure.
Figure 2:
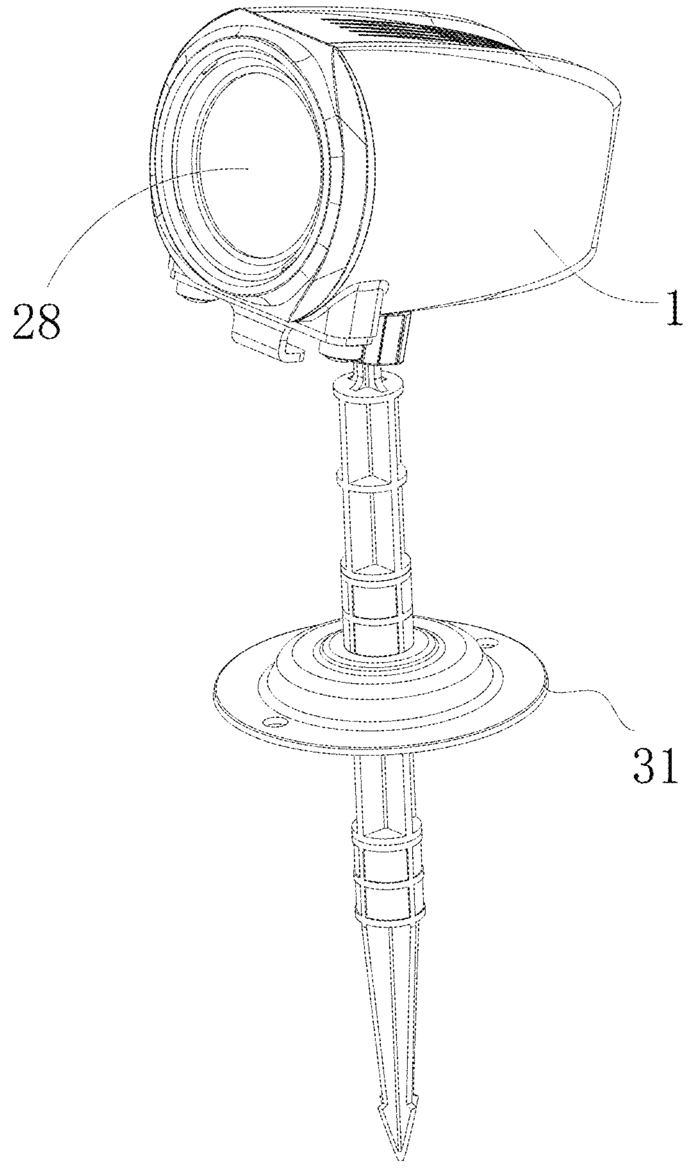
FIG. 2 is an overall assembled schematic diagram of a projection lamp in an embodiment of the present disclosure.

Further, in this embodiment, as shown in FIG. 1, an inner cover 19 is arranged in the housing 1, and the module bracket 17 is fixed in the inner cover 19. A light through hole is arranged in a front side surface of the inner cover 19, the magnetic base 6 is located in front of the inner cover 19, the light through hole of the magnetic base 6 and the light through hole of the inner cover 19 are coaxial, and an emission port of each of the laser lamps 33 is aligned with the light through hole of the inner cover 19. Besides the effect of fixing the laser module, the inner cover may still play a role of preventing ray divergence.

In this embodiment, the magnet 7 is fixed to a front side surface of the magnetic base 6, and a magnetic cover 20 and a magnetic bottom 21 are respectively fixed to the front side surface and a back side surface of the magnetic base 6. The magnetic cover 20 and the magnetic bottom 21 are each provided with light through holes, and the light through holes of the magnetic cover 20 and the magnetic bottom 21 are coaxial with the light through hole of the magnetic base 6. The magnetic cover 20 covers the magnet 7. The magnetic cover 20 may prevent the magnet 7 from falling.

In this embodiment, a grating cover 22 is embedded into the light through hole of the grating fixing base 12, a grating mounting groove 23 is arranged on a back side surface of the grating cover 22, and the grating 11 is embedded into the grating mounting groove 23. The grating cover 22 is provided with a light through hole corresponding to the grating 11.

In this embodiment, the magnetic base 6 and the driven gear 14 are integrally formed.

Figure 7:
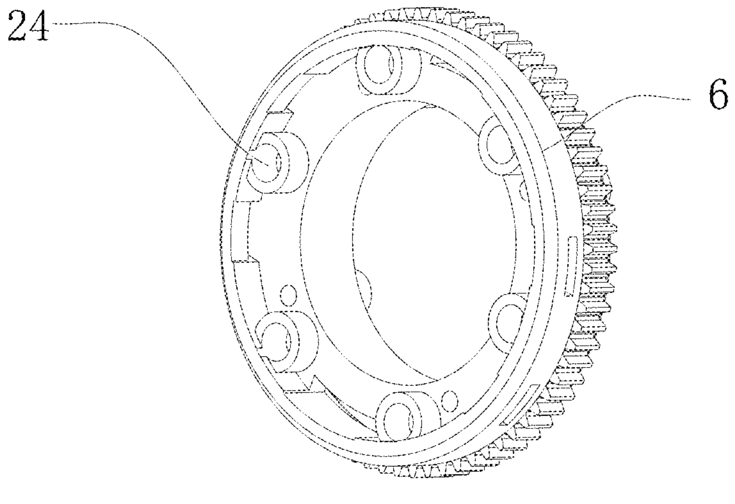
FIG. 7 is a schematic structural diagram of a magnetic base in an embodiment of the present disclosure.

In this embodiment, as shown in FIG. 7, multiple magnet mounting grooves 24 are uniformly formed in the front side surface of the magnetic base 6 along a circumferential direction, and the magnet 7 is embedded into each of the magnet mounting grooves 24.

Figure 8:
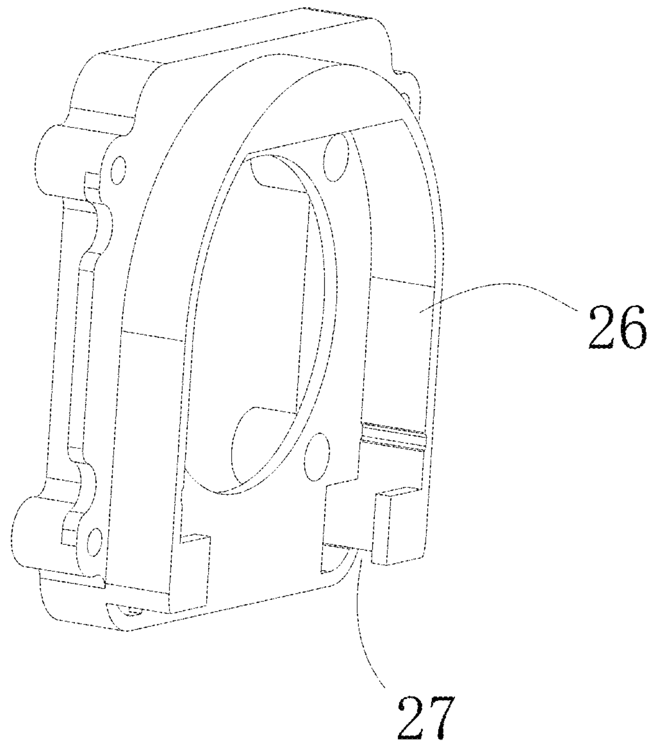
FIG. 8 is a schematic structural diagram of a tray bracket in an embodiment of the present disclosure.
Figure 9:
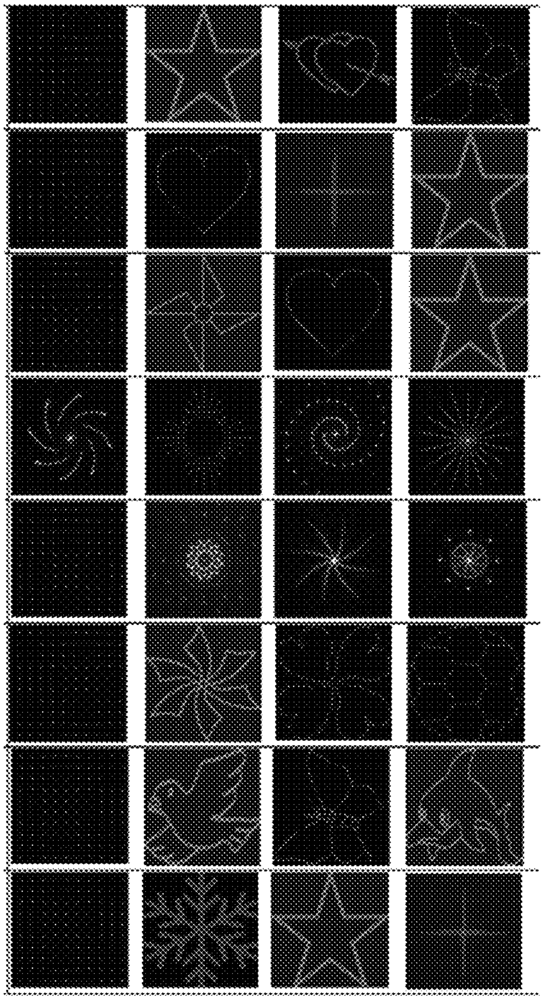
FIG. 9-FIG. 17 are examples of a projection effect achievable by replacing a grating in embodiments of the present disclosure.
Figure 10:
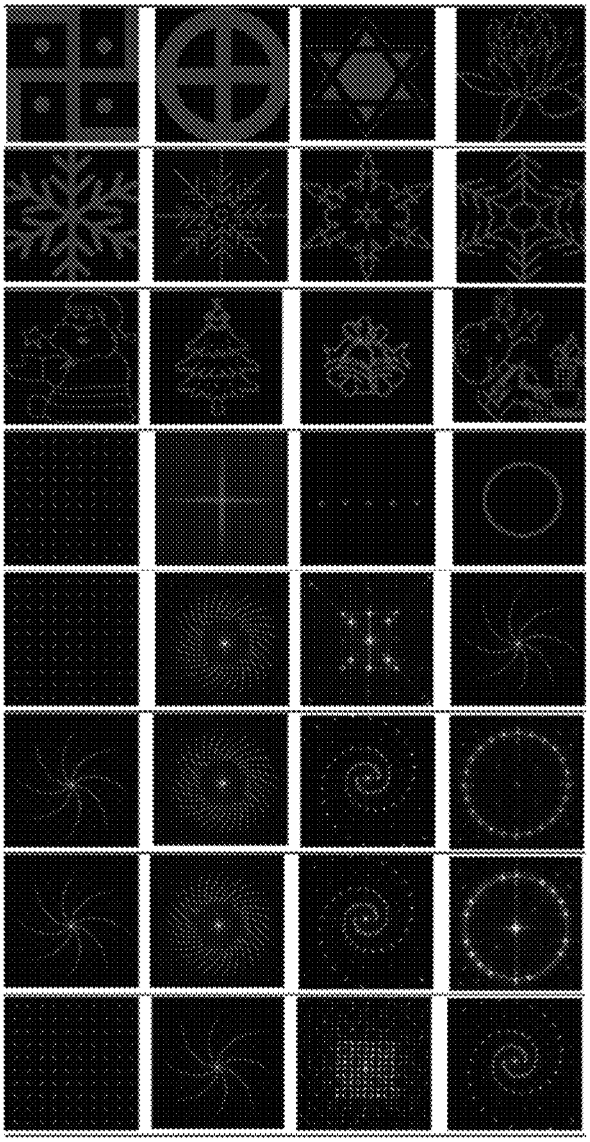
Figure 11:
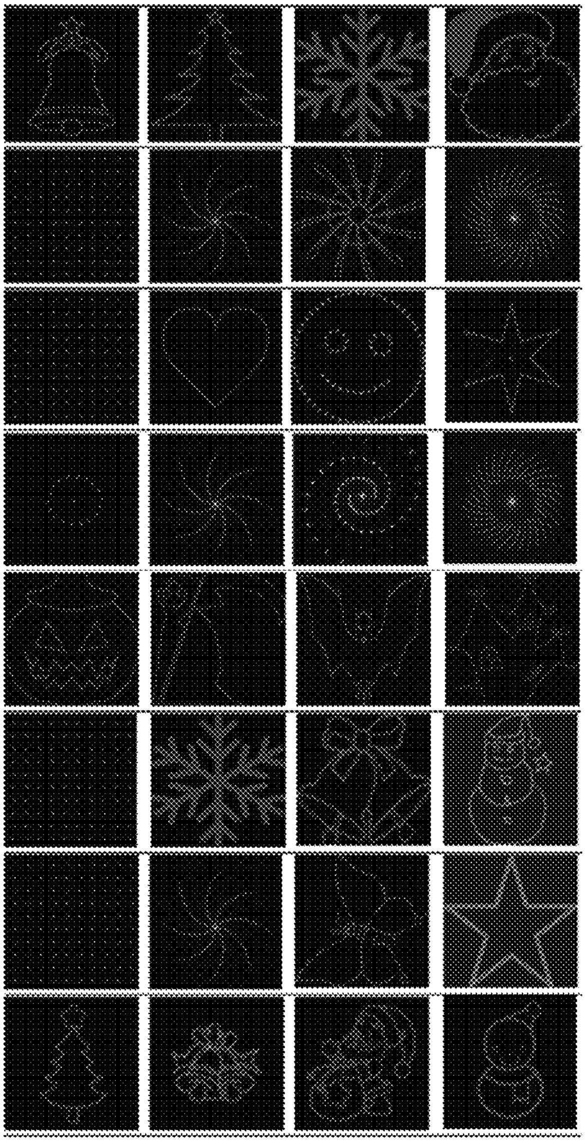
Figure 12:
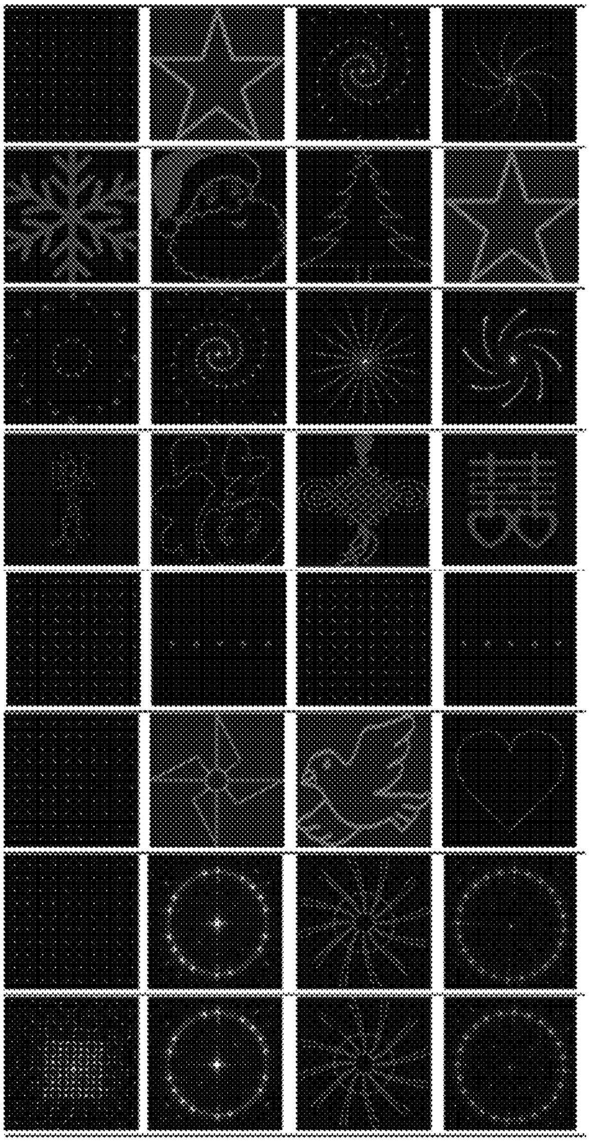
Figure 13:
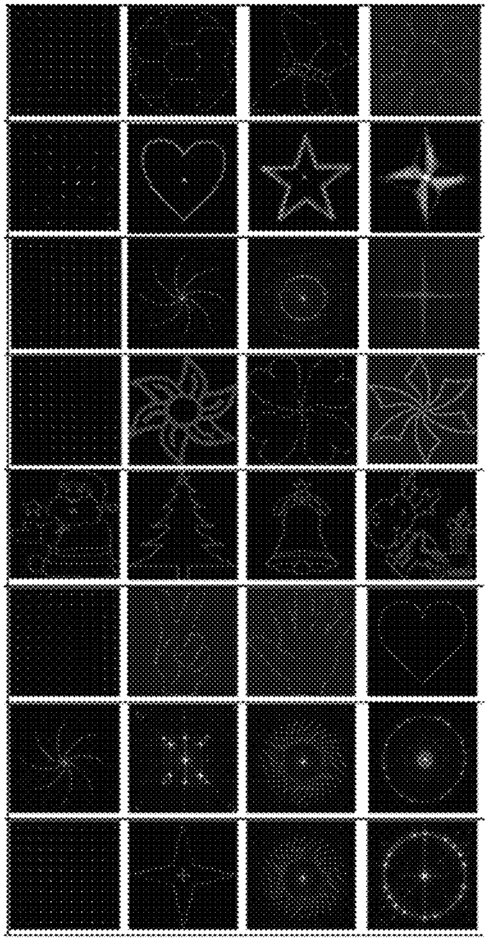
Figure 14:
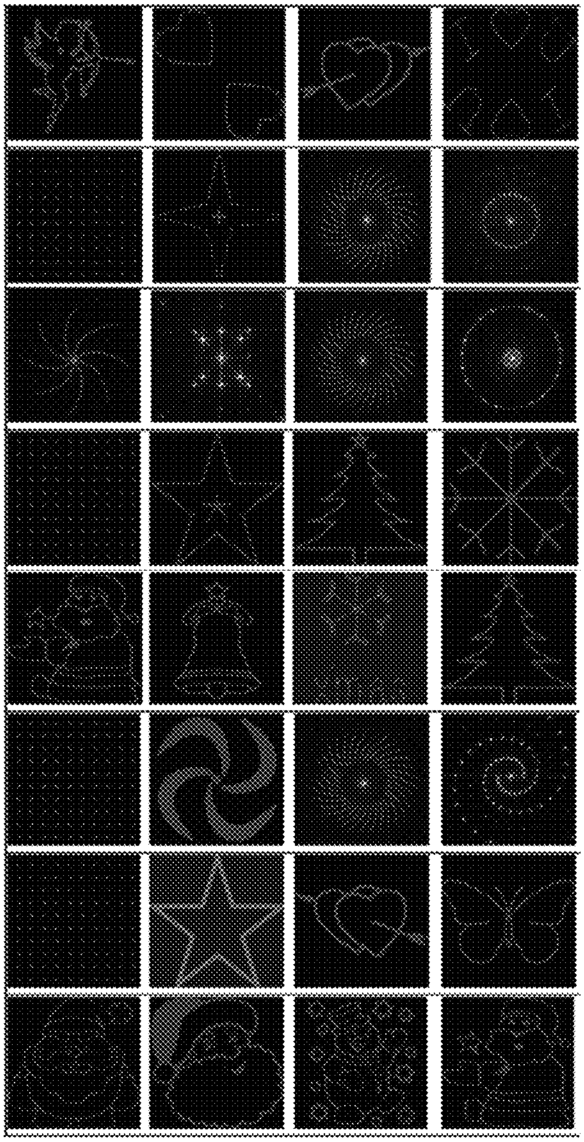
Figure 15:
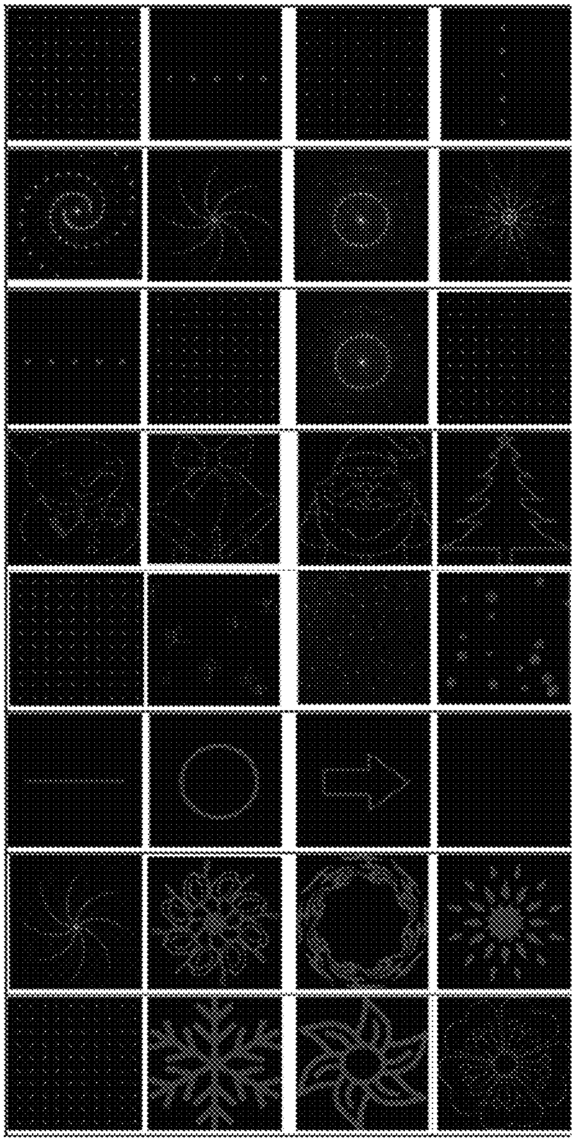
Figure 16:
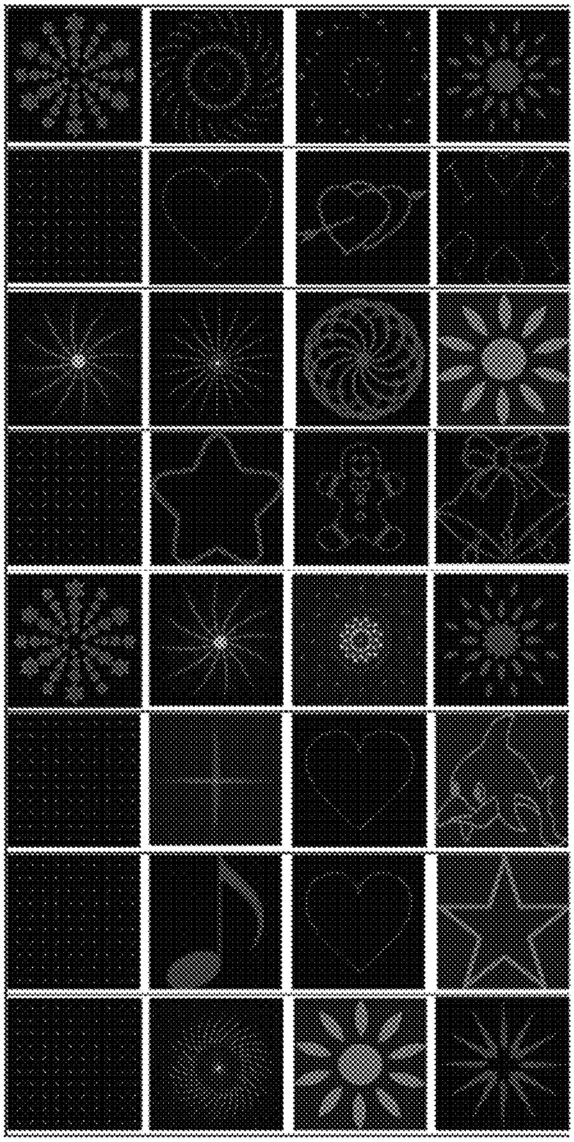
Figure 17:
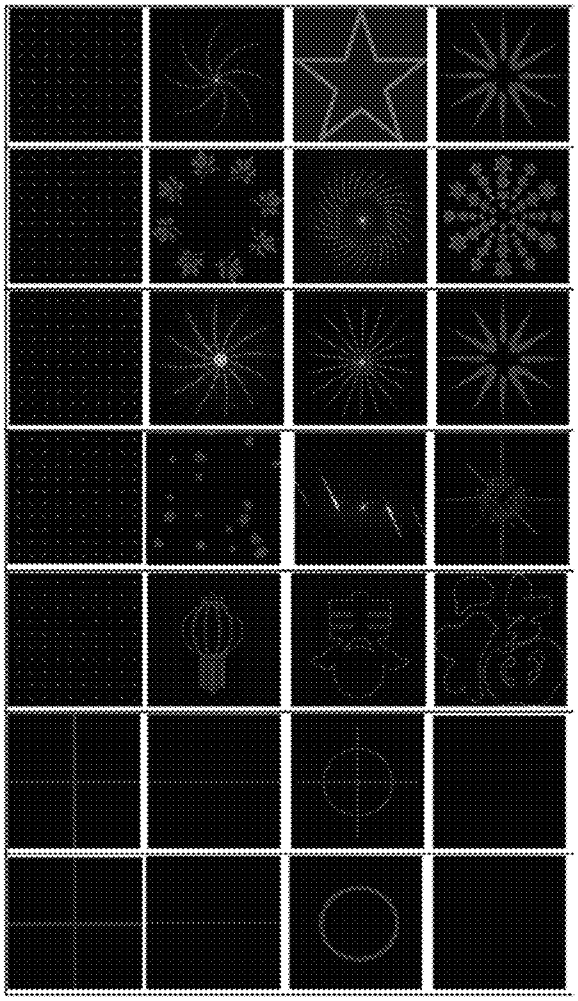

In this embodiment, as shown in FIG. 8, a tray bracket 25 is further arranged in the housing 1, the tray bracket 25 is fixed in the housing 1, a tray slot 26 is arranged on the tray bracket 25, the tray 10 is inserted into the tray slot 26 and is slidable in and out the tray slot 26 through an opening 27 of the tray slot 26, and a direction in which the tray 10 is slidable in and out the tray slot 26 is the same as a direction in which the tray 10 is slidable in and out the tray access port 15. More specifically, the tray access port is arranged at a bottom of the housing, an opening of the tray slot 26 is also arranged at a bottom of the tray slot 26, and a bottom of the tray 10 stretches out from the tray access port 15 to the outer side of the housing 1. When the tray 10 is pulled downward from the outer side of the housing 1, the tray 10 may be pulled out from the tray slot 26 and is finally pulled out from the housing 1.

Further, in the foregoing structure of the present disclosure, other lighting effect assemblies in the prior art may also be additionally arranged. When other lighting effect assemblies in the prior art are additionally arranged, the structure of the present disclosure may be changed into double lenses, that is, the pattern projected by the laser module is emitted from one lens, and other lighting effect assemblies in the prior art project from the other lens, so that the lighting effect of the present disclosure may be further enriched.

It should be noted that other lighting effect assemblies in the prior art may have a "water ripple" lighting effect, a "northern lights" lighting effect, and the like in the prior art.

In this embodiment, an embedding groove is arranged on a front side of the iron sheet fixing base 9, and the grating fixing base 12 is embedded into the embedding groove.

In this embodiment, a lens 28 is further arranged in the housing 1, and the lens 28 is located in front of the grating module 3. The lens 28 is fixed to a front side surface of an inner cap 29, the inner cap 29 is fixed in the housing 1, and the inner cap 29 is provided with a light emission hole corresponding to the grating 11. After passing through the grating 11, the ray further passes through the lens 28 and is emitted, so that the ray is more flexible.

In this embodiment, a tray bracket 30 is arranged at an inner ring of the tray bracket 25, the tray bracket 30 is detachably fixed to the inner ring of the tray bracket 25, a mounting slot is arranged at the inner ring of the tray bracket 30, and a peripheral edge of the iron sheet fixing base 9 is embedded into the mounting slot.

In this embodiment, the housing 1 is connected to a projection lamp bracket 31. The projection lamp bracket 31 is mainly used to mount the overall projection lamp, and may be mounted in a common multi-angle rotating mode.

In order to improve the heat dissipation effect of the present disclosure, further, a cooling fan 32 is arranged on a rear side in the housing 1 of the present disclosure, and a heat dissipation hole is correspondingly arranged on a back side surface of the housing 1.

Certainly, in other embodiments, there may be no structure of the cooling fan, and natural wind heat dissipation may also be used.

For persons skilled in the art, various corresponding changes and variations may be proposed based on the above technical solutions and concepts; and all of these changes and variations shall be included within the scope of protection of the claims of the present disclosure.

What is claimed is:

1. A projection lamp with a replaceable grating sheet, comprising a housing, a laser module, a grating module, and a control board, wherein the laser module, the grating module, and the control board are arranged in the housing, and the grating module is arranged in front of the laser module; and the grating module comprises a motor, a gear set, a magnetic base, a magnet, an iron sheet, an iron sheet fixing base, a tray, a grating, and a grating fixing base, wherein the gear set comprises a driving gear and a driven gear meshing with each other, the driving gear is coaxially fixed to an output shaft of the motor, and the driven gear is coaxially fixed to the magnetic base; the magnet is fixed to the magnetic base, the iron sheet is fixed to the iron sheet fixing base, and the iron sheet and the magnet adsorb with each other magnetically; the grating is detachably fixed to the grating fixing base; the grating fixing base and the iron sheet fixing base are fixedly connected and mounted on an inner ring of the tray, and are axially rotatable in the inner ring of the tray; the housing is provided with a tray access port, a part of the tray stretches out from the tray access port to an outer side of the housing, and the tray is slidable in and out the housing via the tray access port; the magnetic base, the iron sheet, the iron sheet fixing base, and the grating fixing base are each provided with light through holes corresponding to the laser module, and the grating corresponds to the light through hole of the grating fixing base; an emission aperture is arranged on a front side surface of the housing and corresponds to the grating; and the control board is electrically connected to and controls the motor and the laser module.

2. The projection lamp with a replaceable grating sheet according to claim 1, wherein the laser module comprises a plurality of laser lamps with different colors and a module bracket, a mounting through slot is arranged in an inner cavity of the module bracket, and the plurality of laser lamps with different colors are inserted into the mounting through slot; and the control board is electrically connected to and controls the laser lamps with different colors.

3. The projection lamp with a replaceable grating sheet according to claim 1, wherein an inner cover is arranged in the housing, and the laser module is fixed in the inner cover; and a light through hole is arranged in a front side surface of the inner cover, the magnetic base is located in front of the inner cover, the light through hole of the magnetic base and the light through hole of the inner cover are coaxial, and an emission port of the laser module is aligned with the light through hole of the inner cover.

4. The projection lamp with a replaceable grating sheet according to claim 1, wherein the magnet is fixed to a front side surface of the magnetic base, and a magnetic cover and a magnetic bottom are respectively fixed to the front side surface and a back side surface of the magnetic base; the magnetic cover and the magnetic bottom are each provided with light through holes, and the light through holes of the magnetic cover and the magnetic bottom are coaxial with the light through hole of the magnetic base; and the magnetic cover covers the magnet.

5. The projection lamp with a replaceable grating sheet according to claim 1, wherein a grating cover is embedded into the light through hole of the grating fixing base, a grating mounting groove is arranged on a back side surface of the grating cover, and the grating is embedded into the grating mounting groove; and the grating cover is provided with a light through hole corresponding to the grating.

6. The projection lamp with a replaceable grating sheet according to claim 1, wherein the magnetic base and the driven gear are integrally formed.

7. The projection lamp with a replaceable grating sheet according to claim 1, wherein a plurality of magnet mounting grooves are uniformly formed in a front side surface of the magnetic base along a circumferential direction, and the magnet is embedded into each of the magnet mounting grooves.

8. The projection lamp with a replaceable grating sheet according to claim 1, wherein a tray bracket is further arranged in the housing, the tray bracket is fixed in the housing, a tray slot is arranged on the tray bracket, the tray is inserted into the tray slot and is slidable in and out the tray slot through an opening of the tray slot, and a direction in which the tray is slidable in and out the tray slot is the same as a direction in which the tray is slidable in and out the tray access port.

9. The projection lamp with a replaceable grating sheet according to claim 1, wherein a lens is further arranged in the housing, and the lens is located in front of the grating module; and the lens is fixed to a front side surface of an inner cap, the inner cap is fixed in the housing, and the inner cap is provided with a light emission hole corresponding to the grating.

10. The projection lamp with a replaceable grating sheet according to claim 1, wherein a cooling fan is arranged on a rear side in the housing, and a heat dissipation hole is correspondingly arranged on a back side surface of the housing.

* * * * *